United States Patent
Kang

(10) Patent No.: US 12,160,118 B2
(45) Date of Patent: Dec. 3, 2024

(54) WIRELESS POWER TRANSMITTING APPARATUS, CONTROL METHOD OF WIRELESS POWER TRANSMITTING APPARATUS, AND WIRELESS POWER SYSTEM

(71) Applicant: Samsung Electronics Co., Ltd., Suwon-si (KR)

(72) Inventor: Heejun Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 18/183,837

(22) Filed: Mar. 14, 2023

(65) Prior Publication Data

US 2023/0216349 A1    Jul. 6, 2023

Related U.S. Application Data

(63) Continuation of application No. PCT/KR2021/009150, filed on Jul. 16, 2021.

(30) Foreign Application Priority Data

Sep. 14, 2020  (KR) ........................ 10-2020-0117521

(51) Int. Cl.
*H02J 50/12* (2016.01)
*A47J 27/00* (2006.01)
(Continued)

(52) U.S. Cl.
CPC ............. *H02J 50/12* (2016.02); *A47J 27/004* (2013.01); *A47J 36/321* (2018.08); *H02J 9/005* (2013.01);
(Continued)

(58) Field of Classification Search
None
See application file for complete search history.

(56) References Cited

U.S. PATENT DOCUMENTS 3,761,668 A    9/1973   Harnden, Jr. et al.
7,661,354 B2   2/2010   Shao
(Continued)

FOREIGN PATENT DOCUMENTS

CN    1561890 A      1/2005
CN    109945248 B    6/2020
(Continued)

OTHER PUBLICATIONS

International Search Report dated Nov. 5, 2021 in connection with International Patent Application No. PCT/KR2021/009150, 2 pages.

*Primary Examiner* — Daniel Kessie

(57) ABSTRACT

A disclosed wireless power transmitting apparatus comprises: a plate; a transmitting coil that transmits wireless power to a cooking device disposed on the plate; a driving circuit that applies a current to the transmitting coil; a communication module that communicates with the cooking device; and a control unit that controls the driving circuit such that the wireless power is periodically transmitted on the basis of a transmission period of the wireless power determined by discharge characteristics of the cooking device when the cooking device enters a standby mode.

14 Claims, 10 Drawing Sheets

(51) Int. Cl.
*A47J 36/32* (2006.01)
*H02J 9/00* (2006.01)
*H02J 50/40* (2016.01)
*H02J 50/80* (2016.01)
*H04B 5/79* (2024.01)

(52) U.S. Cl.
CPC ............ *H02J 50/402* (2020.01); *H02J 50/80* (2016.02); *H04B 5/79* (2024.01)

(56) References Cited

U.S. PATENT DOCUMENTS

| | | | |
|---|---|---|---|
| 8,179,698 B2 | 5/2012 | Jang et al. | |
| 9,125,160 B2 | 9/2015 | Lee | |
| 9,812,891 B2 | 11/2017 | Won et al. | |
| 9,831,030 B2 | 11/2017 | Kwak et al. | |
| 9,853,456 B2 | 12/2017 | Kwon et al. | |
| 10,396,599 B2 | 8/2019 | Bae | |
| 10,855,109 B2 | 12/2020 | Van Wageningen et al. | |
| 10,910,881 B2 | 2/2021 | Taniguchi et al. | |
| 11,139,672 B2 | 10/2021 | Jeon et al. | |
| 11,419,188 B2 | 8/2022 | Ok et al. | |
| 2010/0087157 A1 | 4/2010 | Takahara | |
| 2012/0000903 A1* | 1/2012 | Baarman | H05B 6/1236 219/620 |
| 2019/0200419 A1 | 6/2019 | Lei et al. | |
| 2020/0163169 A1 | 5/2020 | Jeong | |
| 2020/0212729 A1 | 7/2020 | Smith et al. | |
| 2020/0236741 A1* | 7/2020 | Bunya | H02J 50/10 |

FOREIGN PATENT DOCUMENTS

| | | |
|---|---|---|
| JP | 2008-131812 A | 6/2008 |
| JP | 2010-092195 A | 4/2010 |
| JP | 2020-036519 A | 3/2020 |
| JP | 2020-036529 A | 3/2020 |
| KR | 10-2014-0124704 A | 10/2014 |
| KR | 10-2015-0031852 A | 3/2015 |
| KR | 10-2015-0074393 A | 7/2015 |
| KR | 10-1635972 B1 | 7/2016 |
| KR | 10-1669877 B1 | 10/2016 |
| KR | 10-1702584 B1 | 2/2017 |
| KR | 10-1727744 B1 | 4/2017 |
| KR | 10-2017-0067169 A | 6/2017 |
| KR | 10-2017-0105642 A | 9/2017 |
| KR | 10-1807335 B1 | 1/2018 |
| KR | 10-2018-0102901 A | 9/2018 |
| KR | 10-2019-0011087 A | 2/2019 |
| KR | 10-2019-0024547 A | 3/2019 |
| KR | 10-2020-0015007 A | 2/2020 |
| KR | 10-2096312 B1 | 4/2020 |
| KR | 10-2020-0058240 A | 5/2020 |

* cited by examiner

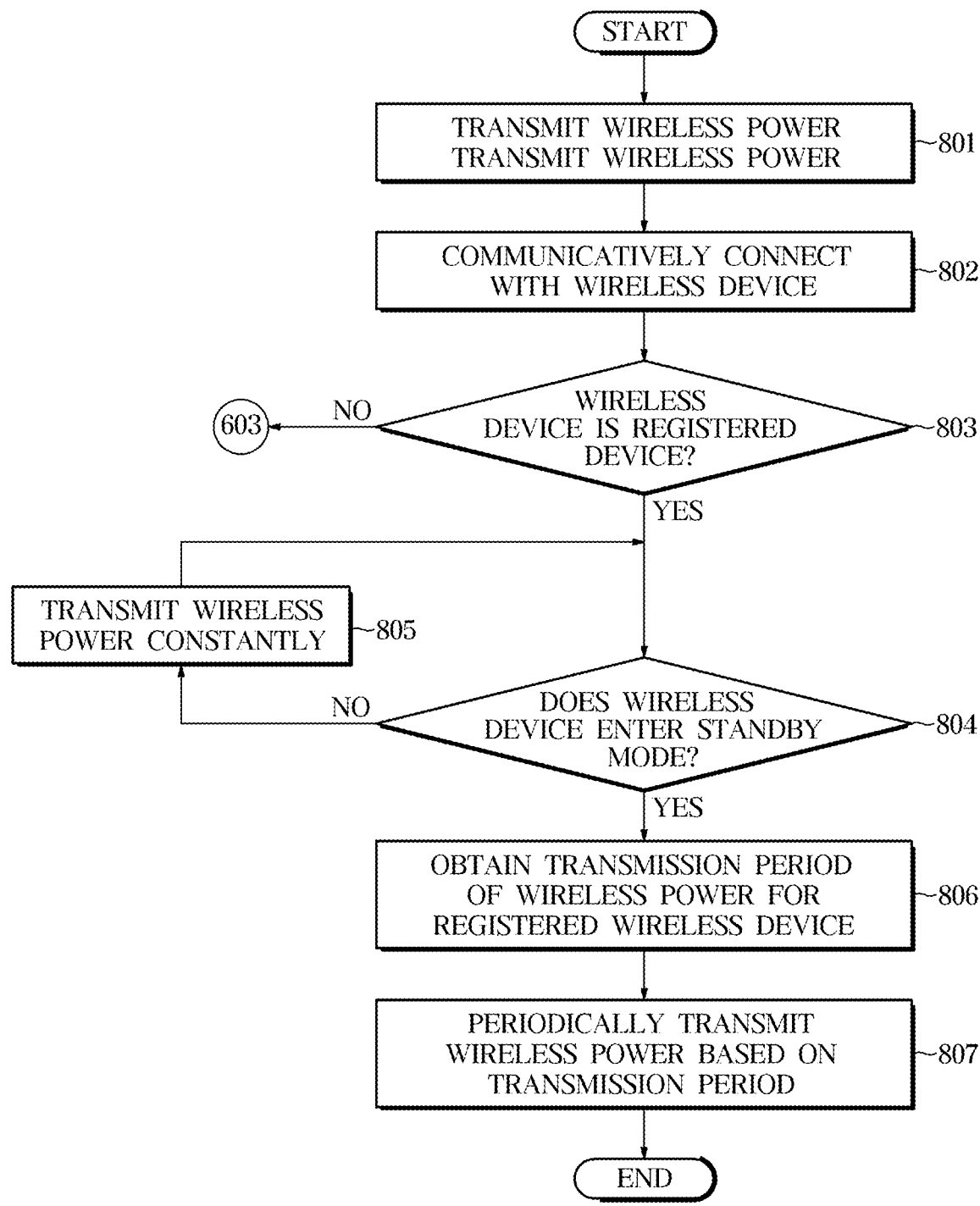

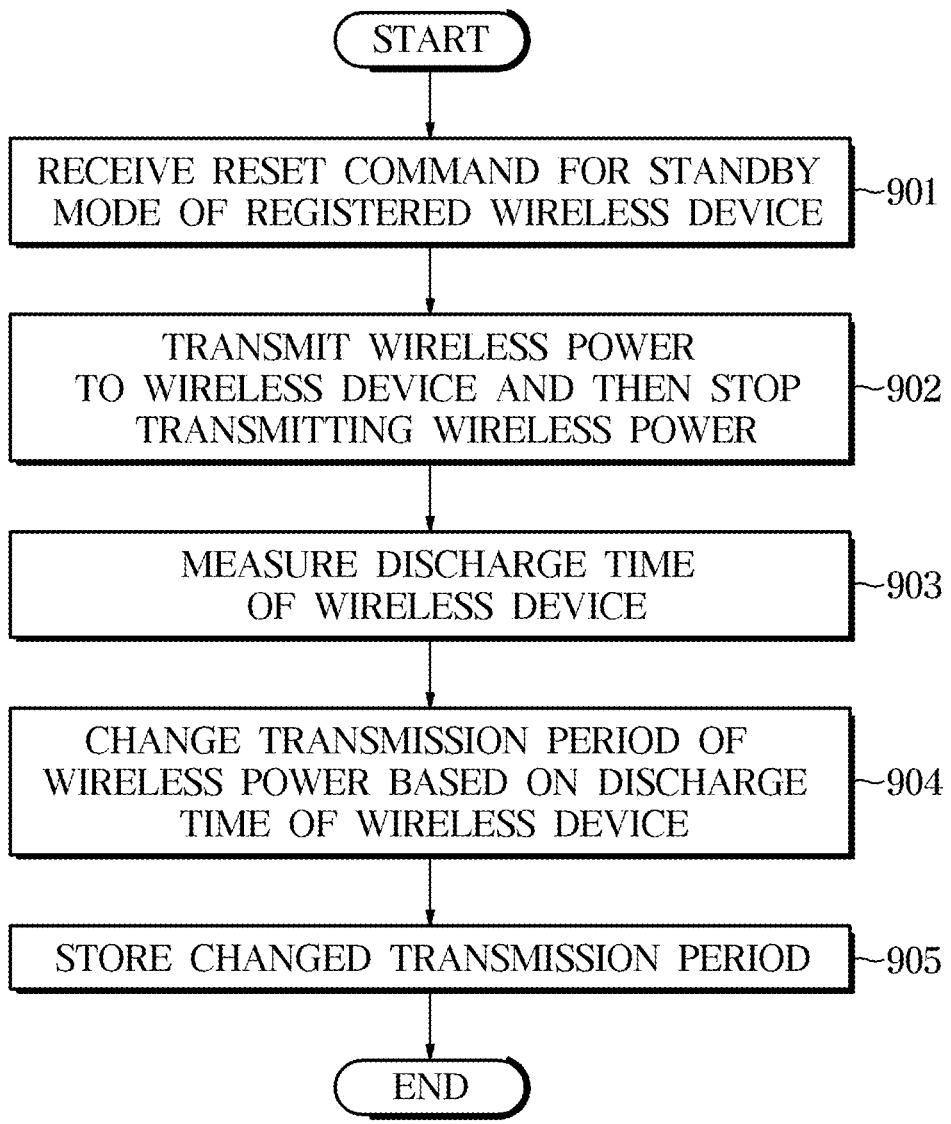

WIRELESS POWER TRANSMITTING APPARATUS, CONTROL METHOD OF WIRELESS POWER TRANSMITTING APPARATUS, AND WIRELESS POWER SYSTEM

CROSS-REFERENCE TO RELATED APPLICATIONS

This application is a Bypass Continuation of International Patent Application No. PCT/KR2021/009150 filed on Jul. 16, 2021, which claims priority to Korean Patent Application No. 10-2020-0117521 filed on Sep. 14, 2020, in the Korean Intellectual Property Office, the disclosures of which are herein incorporated by reference in their entirety.

BACKGROUND

1. Field

The present disclosure relates to a wireless power transmitting apparatus capable of supplying wireless power to a wireless device, a method for controlling the wireless power transmitting apparatus, and a wireless power system.

2. Description of Related Art

Recently, a technique for supplying wireless power has been developed and applied to many electronic devices. An electronic device to which a wireless power transmission technique is applied receives power in a wireless manner without requiring a direct connection with a charging connector. For example, a technique of providing wireless power to various home appliances by using a product such as a cooktop including an induction is being developed.

Wireless power transmission techniques include a magnetic induction method using magnetic induction between a primary coil and a secondary coil, and a magnetic resonance method in which a primary coil and a secondary coil use the same frequency.

Meanwhile, a wireless device may include a power supply such as a battery. In this case, existing techniques transmit wireless power for operating the wireless device constantly. However, because the existing techniques transmit wireless power constantly even in a standby state in which the wireless device does not operate, power loss is generated. Accordingly, a technique for reducing power loss in a standby state of a wireless device is required.

The disclosure provides a wireless power transmitting apparatus capable of minimizing standby power by adjusting transmission of wireless power in a standby mode of a wireless device, a method for controlling the wireless power transmitting apparatus, and a wireless power system.

SUMMARY

A wireless power transmitting apparatus according to an embodiment includes: a plate; a transmitting coil configured to transmit wireless power to a cooking device positioned on the plate, the cooking device including a heater; a driving circuit configured to apply current to the transmitting coil; a communication module configured to communicate with the cooking device; and a controller configured to control, in a case in which the cooking device enters a standby mode, the driving circuit to periodically transmit the wireless power based on a transmission period of the wireless power, wherein the transmission period is set by a discharge characteristic of the cooking device.

The discharge characteristic of the cooking device may include a discharge time of the cooking device, measured in a state in which transmission of the wireless power stops, and the controller may be configured to set the transmission period of the wireless power for the standby mode of the cooking device based on the discharge time of the cooking device.

The controller may be configured to control, in a case in which the cooking device enters the standby mode, the driving circuit to stop transmitting the wireless power, and measure the discharge time of the cooking device after stopping transmission of the wireless power.

The controller may be configured to detect a communication termination time at which a communication between the communication module and the cooking device terminates, and set a time elapsed from a transmission stop time of the wireless power to the communication termination time as the discharge time of the cooking device.

The controller may be configured to set a time elapsed from a transmission stop time of the wireless power to a time at which activation data stored in a communication module of the cooking device is deleted as the discharge time of the cooking device.

The controller may be configured to identify whether the activation data exists in a communication module of the cooking device by transmitting a test signal to the cooking device.

The controller may be configured to obtain, in a case in which the cooking device is a registered device, a transmission period of wireless power for the registered cooking device from a memory.

The controller may be configured to control, in a case in which a reset command for the standby mode of the registered cooking device is received, the driving circuit to transmit the wireless power to the cooking device and then stop transmitting the wireless power to the cooking device, and to change the transmission period of the wireless power by measuring a discharge time of the cooking device.

A method for controlling a wireless power transmitting apparatus including a transmitting coil, a driving circuit configured to apply current to the transmitting coil, and a communication module, according to an embodiment, includes: transmitting wireless power to a cooking device positioned on a plate by the transmitting coil, the cooking device including a heater; communicating with the cooking device by the communication module; obtaining a discharge characteristic of the cooking device in a case in which the cooking device enters a standby mode; setting a transmission period of the wireless power based on the discharge characteristic of the cooking device; and controlling the driving circuit configured to apply current to the transmitting coil such that the wireless power is periodically transmitted.

The discharge characteristic of the cooking device may include a discharge time of the cooking device, measured in a state in which transmission of the wireless power stops, and the setting of the transmission period of the wireless power may include setting the transmitting period of the wireless power for the standby mode of the cooking device based on the discharge time of the cooking device.

The obtaining of the discharge characteristic of the cooking device may include: controlling the driving circuit to stop transmitting the wireless power in a case in which the cooking device enters the standby mode; and measuring a discharge time of the cooking device after stopping transmission of the wireless power.

The measuring of the discharge time of the cooking device may include detecting a communication termination time at which a communication between the communication module and the cooking device terminates; and setting a time elapsed from a transmission stop time of the wireless power to the communication termination time as the discharge time of the cooking device.

The measuring of the discharge time of the cooking device may include setting a time elapsed from a transmission stop time of the wireless power to a time at which activation data stored in a communication module of the cooking device is deleted as the discharge time of the cooking device.

The measuring of the discharge time of the cooking device may further include identifying whether the activation data exists in a communication module of the cooking device by transmitting a test signal to the cooking device.

The setting of the transmission period of the wireless power may include obtaining, in a case in which the cooking device is a registered device, a transmission period of wireless power for the registered cooking device from a memory.

The method for controlling the wireless power transmitting apparatus, according to an embodiment, may further include controlling, in a case in which a reset command for the standby mode of the registered cooking device is received, the driving circuit to transmit the wireless power to the cooking device and then stop transmission; and changing the transmission period of the wireless power by measuring a discharge time of the cooking device.

A wireless power system according to an embodiment includes a cooking device; and a wireless power transmitting apparatus configured to transmit wireless power to the cooking device, and periodically transmit the wireless power in a case in which the cooking device enters a standby mode, based on a transmission period of the wireless power, set by a discharge characteristic of the cooking device.

The wireless power transmitting apparatus may stop transmitting the wireless power in a case in which the cooking device enters the standby mode, measure a discharge time of the cooking device, and set a transmission period of the wireless power for the standby mode of the cooking device based on the discharge time of the cooking device.

The wireless power transmitting apparatus may detect a communication termination time at which a communication with the cooking device terminates, and set a time elapsed from a time at which transmission of the wireless power stops to the communication termination time, to the discharge time of the cooking device.

A wireless power transmitting apparatus, a method for controlling the wireless power transmitting apparatus, and a wireless power system, according to the disclosure, may minimize consumption of standby power by adjusting transmission of wireless power in a standby mode of a wireless device. Accordingly, power efficiency of the wireless power transmitting apparatus may be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9 and 10 are flowcharts for describing a method for controlling a wireless power transmitting apparatus for a registered wireless device.

DETAILED DESCRIPTION

Figure 1:
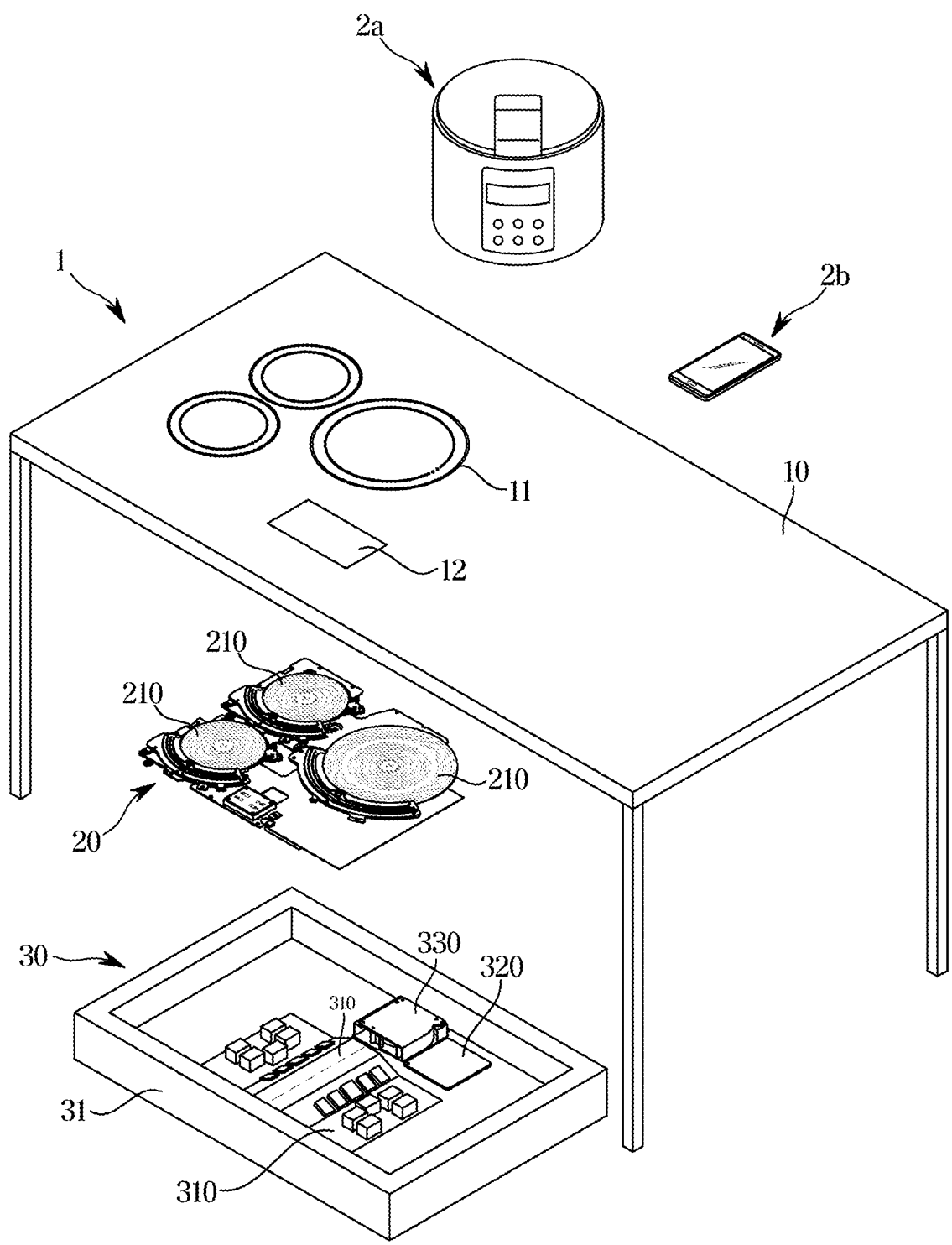
FIG. 1 shows a wireless power system including a wireless power transmitting apparatus according to an embodiment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals will refer to like components throughout this specification. This specification does not describe all components of the embodiments, and general information in the technical field to which the present disclosure belongs or overlapping information between the embodiments will not be described. As used herein, the terms "portion", "part, "module, "member" or "block" may be implemented as software or hardware, and according to embodiments, a plurality of "portions", "parts, "modules, "members" or "blocks" may be implemented as a single component, or a single "portion", "part, "module, "member" or "block" may include a plurality of components.

Through the entire specification, it will be understood that when a certain part is referred to as being "connected" to another part, it can be directly or indirectly connected to the other part. When a part is indirectly connected to another part, it may be connected to the other part through a wireless communication network or may be electrically connected to the other part through electrical wiring.

The terms used in the present specification are merely used to describe embodiments, and are not intended to limit and/or restrict the disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

Also, in the entire specification, it will also be understood that the terms including ordinal numbers such as "first" and "second" are used to distinguish a plurality of components from each other, not to represent an arrangement, a manufacturing order, importance, etc. of the components. As used herein, the term "and/or" includes any and all combinations of one or more of associated listed items.

Hereinafter, the embodiments of the disclosure will be described in detail.

FIG. 1 shows a wireless power system including a wireless power transmitting apparatus according to an embodiment.

Referring to FIG. 1, a wireless power system may be defined to include a wireless power transmitting apparatus 1 and a wireless device 2. The wireless power transmitting apparatus 1 may supply wireless power to a wireless device 2 (2a, 2b) capable of receiving wireless power. For example, according to positioning of the wireless device 2 in an operation area 11 provided on a plate 10 of the wireless power transmitting apparatus 1, the wireless power transmitting apparatus 1 may transmit wireless power to the wireless device 2.

The wireless power transmitting apparatus 1 can be in a shape of a table, as shown in FIG. 1, may be an example, and the wireless power transmitting apparatus 1 may be provided in various shapes. Also, the wireless device 2 may be an electric rice cooker 2a and a smart phone 2b. However, the wireless device 2 may include various electronic devices.

The wireless power transmitting apparatus 1 may transmit wireless power to the wireless device 2 by using a wireless power transmission technique of a known magnetic induction method or a known magnetic resonance method. The wireless induction method may be a method for causing current to flow through a secondary coil by changing a magnetic field of a transmitting coil to induce a voltage in a receiving coil. The magnetic resonance method may be a method that causes resonance between a transmitting coil and a receiving coil by using the same resonance frequency and transmits power by the resonance.

The wireless power transmitting apparatus 1 may include a plate 10, a coil assembly 20, and a driving assembly 30. The coil assembly 20 and the driving assembly 30 can be provided below the plate 10. The plate 10 may be provided as various materials. For example, the plate 10 may be provided as a tempered glass such as a ceramic glass.

A driving area 11 where the wired device 2 receives wired power may be provided on an upper surface of the plate 10. FIG. 1 shows an example in which three driving areas 11 are provided. However, the number of the driving area 11 may be one or more. The driving area 11 may be positioned to correspond to a transmitting coil 210 which will be described below.

Also, a control panel 12 for receiving a control command from a user and displaying information about an operation of the wireless power transmitting apparatus 1 may be provided in the plate 10. For example, a user may set an operation time of the wireless power transmitting apparatus 1 or input a reset command for a standby mode of the wireless device 2 by using the control panel 12. The control panel 12 may include a button and a display. The control panel 12 may be implemented as a touch screen.

The coil assembly 20 and the driving assembly 30 may be provided inside the plate 10. The coil assembly 20 and the driving assembly 30 may be defined as a power station. The coil assembly 20 may be provided below or inside the plate 10, and may include at least one transmitting coil 210. FIG. 1 shows an example in which three transmitting coils 210 are provided. Also, the coil assembly 20 may be accommodated in a housing of the driving assembly 30. The transmitting coil 210 may generate an electric field and/or an electromagnetic field based on current applied from the driving circuit 310, and may transmit wireless power to the wireless device 2. A plurality of transmitting coils 210 may be provided, wherein the transmitting coils 210 may be driven independently.

The driving assembly 30 may include a driving circuit 310, a communication module 320, and a controller 330. The driving assembly 30 may be accommodated in the housing 31. The driving circuit 310 may apply current to the transmitting coil 210.

The communication module 320 may communicate with the wireless device 2. The communication module 320 may be implemented with various wireless communication techniques. For example, at least one of Radio Frequency, infrared communication, Wireless Fidelity (Wi-Fi), Bluetooth, Zigbee, or Near Field Communication (NFC) may be applied to the communication module 320. Preferably, the communication module 320 may be implemented as a NFC module. The NFC module may communicate with a NFC tag included in the wireless device 2. The NFC module may operate as a tag or reader according to situations. Because NFC is bidirectional communication, NFC may be different from Radio Frequency Identification (RFID) that is one-way communication.

The controller 330 may be electrically connected with the above-described components of the wireless power transmitting apparatus 1, and control operations of the components. That is, the controller 330 may control the control panel 12, the driving circuit 310, and the communication module 320. Meanwhile, the controller 330 may be referred to as a control circuit.

Figure 2:
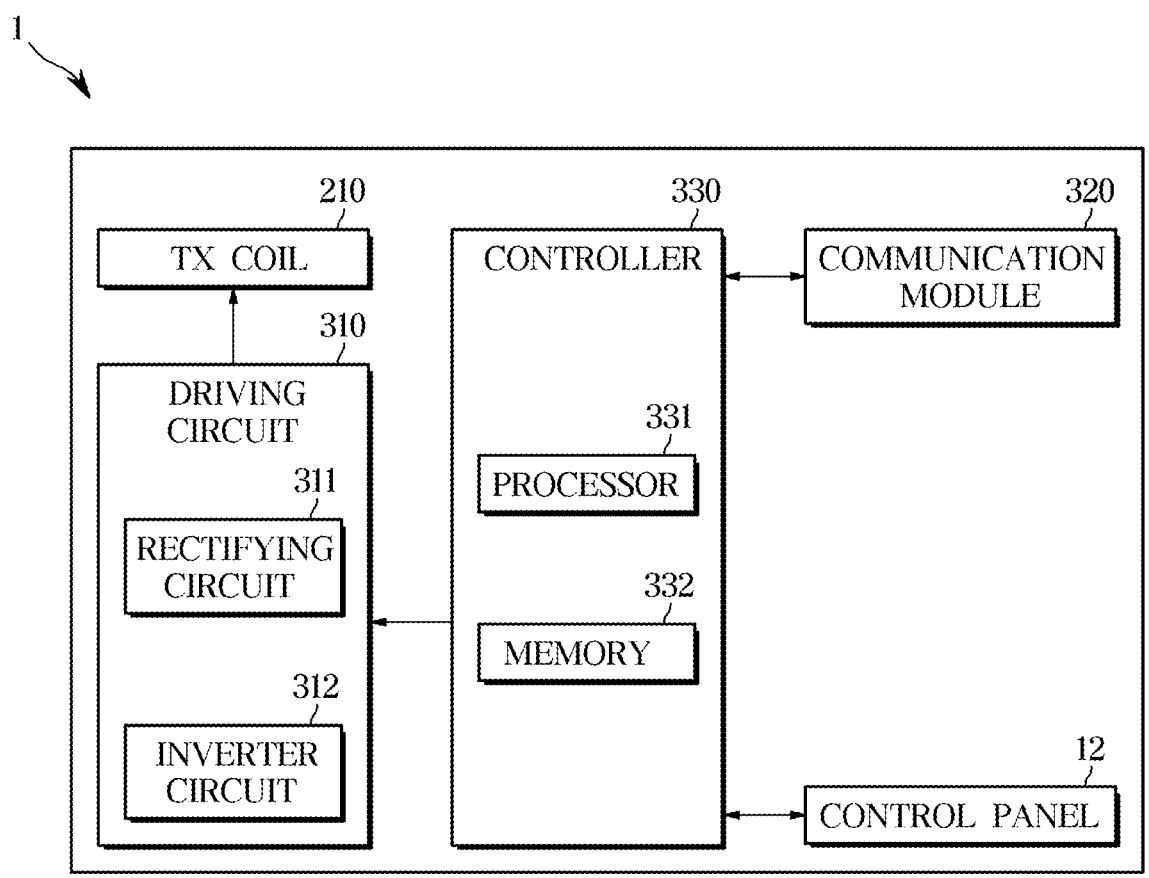
FIG. 2 is a control block diagram of a wireless power transmitting apparatus according to an embodiment.

FIG. 2 is a control block diagram of a wireless power transmitting apparatus according to an embodiment.

Referring to FIG. 2, the wireless power transmitting apparatus 1 may include the driving circuit 310, the communication module 320, the control panel 12, and the controller 330. The controller 330 may control operations of the driving circuit 310, the communication module 320, and the control panel 12. The transmitting coil 210 may be driven by current applied according to an operation of the driving circuit 310.

The driving circuit 310 may rectify power by receiving the power from an external power source, and provide the rectified power to the transmitting coil 210, the communication module 320, the controller 330, and the control panel 12. More specifically, the driving circuit 310 may include a rectifying circuit 311 and an inverter circuit 312.

The rectifying circuit 311 may convert alternating current power into direct current power. The rectifying circuit 311 may convert an alternating current voltage of which a magnitude and polarity (a positive voltage or a negative voltage) change over time into a direct current voltage having a constant magnitude and polarity, and convert alternating current of which a magnitude and direction (positive current or negative current) change over time into direct current having a constant magnitude.

The rectifying circuit 311 may include a bridge diode. The rectifying circuit 311 may include four diodes. The diodes may form two diode pairs, each including two diodes connected in series, and the two diode pairs may be connected in parallel to each other. The bridge diode may convert an alternating current voltage of which a polarity changes over time into a positive voltage having a constant polarity, and convert alternating current of which a direction changes over time into positive current having a constant direction.

Also, the rectifying circuit 311 may include a DC link capacitor. The DC link capacitor may convert a positive voltage of which a magnitude changes over time into a direct current voltage having a constant magnitude. The DC link capacitor may maintain the converted direct current voltage and provide the direct current voltage to the inverter circuit 312.

The inverter circuit 312 may cause current to flow through the transmitting coil 210 by switching a voltage applied to the transmitting coil 210. The inverter circuit 312 may include a switching circuit and a resonance capacitor for supplying current to the transmitting coil 210 or blocking current from being supplied to the transmitting coil 210. The switching circuit may include two switch devices. One end of the transmitting coil 210 may be connected with a contact point of the switch devices, and the other end of the transmitting coil 210 may be connected with the resonance capacitor. The switch devices may be turned on or off according to a control signal from the controller 330. Current and a voltage may be applied to the transmitting coil 210 by a switching operation (on/off) of the switch devices.

Two resonance capacitors may be provided to function as buffers. The resonance capacitor may influence energy loss by adjusting an increase rate of a saturated voltage while the switch devices are off. Also, the resonance capacitor may set a resonance frequency of the transmitting coil 210.

The switch devices may be turned on or off at high speed, and may be implemented as a three-terminal semiconductor device switch having high response speed. For example, the switch devices may be a bipolar junction transistor (BJT), a metal-oxide-semiconductor field effect transistor (MOSFET), an insulated gate bipolar transistor (IGBT), or a thyristor.

The transmitting coil 210 may form a magnetic field by current applied from the inverter circuit 312. By the magnetic field, current and a voltage may be applied to a receiving coil 410 of the wireless device 2 positioned on the driving area 11 of the plate 10.

The communication module 320 may transmit data and/or a signal to the wireless device 2 or receive data and/or a signal from the wireless device 2. For example, the communication module 320 may receive data about a state of the wireless device 2. The communication module 320 may receive data about whether the wireless device 2 is in an operation mode or data about whether the wireless device 22 is in a standby mode. The communication module 320 may be, preferably, an NFC module. The communication module 320 of the wireless power transmitting apparatus 1 may be referred to as a first communication module.

The controller 330 may include a processor 331 and a memory 332. The memory 332 may memorize and/or store programs, instructions, and data for controlling operations of the wireless power transmitting apparatus 1. The processor 331 may generate a control signal for controlling an operation of the wireless power transmitting apparatus 1 based on the programs, instructions, and data memorized and/or stored in the memory 332. The controller 330 may be implemented as a control circuit in which the processor 331 and the memory 332 are mounted. Also, the controller 330 may include a plurality of processors and a plurality of memories. The controller 330 of the wireless power transmitting apparatus 1 may be referred to as a first controller.

The processor 331 may include a logic circuit and an arithmetic circuit as hardware. The processor 331 may process data according to a program and/or instruction provided from the memory 332, and generate a control signal according to a result of the processing.

The memory 332 may include a volatile memory, such as Static Random Access Memory (S-RAM) and Dynamic Random Access Memory (D-RAM), for temporarily memorizing data, and a non-volatile memory, such as Read Only Memory (ROM), Erasable Programmable Read Only Memory (EPROM) or Electrically Erasable Programmable Read Only Memory (EEPROM), for storing data for a long time.

Also, the wireless power transmitting apparatus 1 may further include other components. For example, the wireless power transmitting apparatus 1 may further include a device sensor (not shown) for detecting the wireless device 2 positioned on the driving area 11 of the plate 10, and a relay switch (not shown) for selectively driving the plurality of transmitting coils 210.

Figure 3:
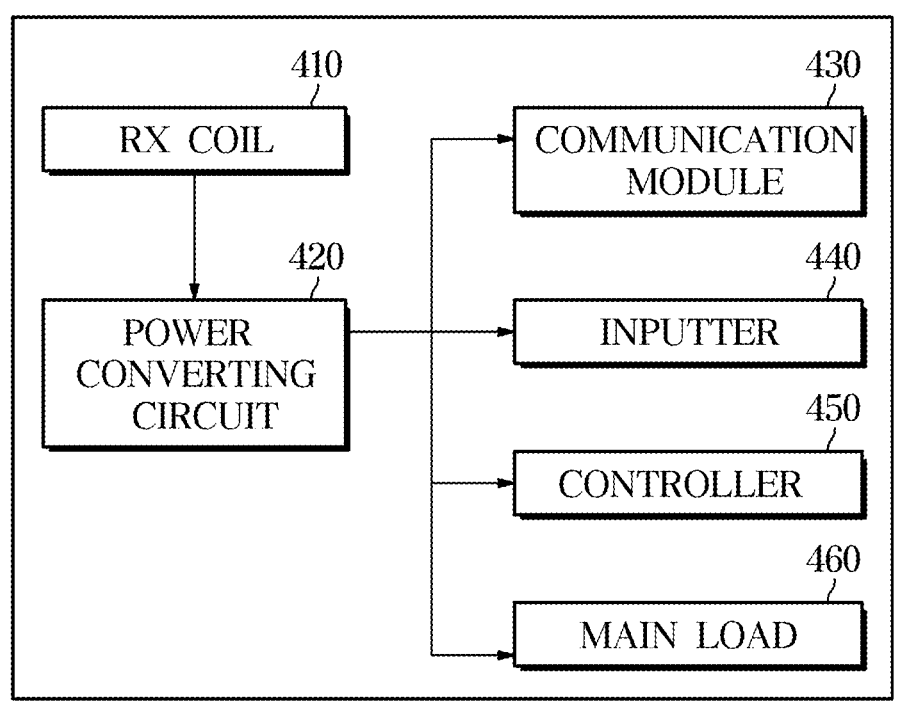
FIG. 3 is a control block diagram of a wireless device.

FIG. 3 is a control block diagram of a wireless device.

Referring to FIG. 3, the wireless device 2 may include the receiving coil 410, a power converting circuit 420, a communication module 430, an inputter 440, a controller 450, and a main load 460. The communication module 430, the inputter 440, the controller 450, and the main load 460 may operate by using power supplied through the receiving coil 410 and the power converting circuit 420.

The receiving coil 410 may receive power from the transmitting coil 210 of the wireless power transmitting apparatus 1. Upon positioning of the wireless device 2 on the driving area 11 provided in the plate 10 of the wireless power transmitting apparatus 1, the receiving coil 410 may receive power by electromagnetic induction.

The power converting circuit 420 may include a rectifying circuit. An alternating current voltage and alternating current may be applied to the receiving coil 410 that receives power from the transmitting coil 210. However, because the communication module 430, the inputter 440, the controller 450, and the main load 460 of the wireless device 2 require direct current power, the power converting circuit 420 may be needed. Also, the power converting circuit 420 may include a direct current-direct current converter for applying appropriate power to each component of the wireless device 2. The power converting circuit 420 may be implemented as a switched-mode power supply (SMPS). The SMPS may be a power supply for converting alternating current power or direct current power by a switching operation and supplying the alternating current power or direct current power.

Meanwhile, the wireless device 2 may have a unique discharge characteristic. Because the power converting circuit 420 of the wireless device 2 includes an energy storage device such as a capacitor, the wireless device 2 may further operate for a certain time even after power transmission from the wireless power transmitting apparatus 1 stops. In other words, after power transmission from the wireless power transmitting apparatus 1 stops, residual power stored in the power converting circuit 420 may be consumed for a certain time. Also, different kinds of wireless devices 2 may have different discharge characteristics. That is, in different kinds of wireless devices 2, residual power of power converting circuits 420 may be consumed at different speed.

For example, although power transmission from the transmitting coil 210 stops, the communication module 430 of the wireless device 2 may be turned off when a certain time elapses after the transmission of wireless power stops. The elapsed time from when power transmission to the wireless device 2 stops to when an operation of the wireless device 2 completely stops may be defined as a 'discharge time'.

The communication module 430 may communicate with the wireless power transmitting apparatus 1. The communication module 430 may be implemented with various wireless communication techniques. For example, at least one of Radio Frequency (RF), infrared communication, Wireless Fidelity (Wi-Fi), Bluetooth, Zigbee, or Near Field Communication (NFC) may be applied to the communication module 320. Preferably, the communication module 320 may be implemented as an NFC tag. The communication module 430 of the wireless device 2 may be referred to as a second communication module.

The communication module 430 of the wireless device 2 may include a memory. The communication module 430 of the wireless device 2 may record activation data in the memory in an activated state and delete the activation data from the memory in an inactivated state.

For example, the NFC tag may include a Static Random Access Memory (SRAM). The SRAM may preserve content while power is supplied to the NFC tag. However, in a case in which power is no longer supplied to the NFC tag, data of the SRAM may be deleted. More specifically, in a case in which power is supplied to the NFC tag, activation data may be recorded in the SRAM, and in a case in which power is no longer supplied to the NFC tag, the activation data recorded in the SRAM may be deleted. Also, the SRAM may enable a fast input/output. That is, NFC activation may be performed rapidly by the SRAM.

The inputter 440 may receive a command for an operation of the wireless device 2 from a user. The inputter 440 may include at least one of a button or a dial. Also, the inputter 440 may include a touch screen.

The controller 450 may be electrically connected with components of the wireless device 2, and control the components. That is, the controller 450 may control the power converting circuit 420, the communication module 430, the inputter 440, and the main load 460. The controller 450 may include a processor and a memory. The controller 450 of the wireless device 2 may be referred to as a second controller.

The main load 460 may be a component that consumes the greatest power in the wireless device 2. For example, in a case in which the wireless device 2 is a cooking device, the main load 460 may be a heat source such as a heater. In a case in which the wireless device 2 is a mixer, the main load 460 may be a motor. In a case in which the wireless device 2 is a light, the main load 460 may be a resistor of a light source.

Meanwhile, in a case in which the wireless device 2 does not have a power supply such as a battery, the wireless device 2 may operate by receiving power from the wireless power transmitting apparatus 1. However, it may be inefficient that the wireless power transmitting apparatus 1 transmits power constantly in a standby state of the wireless device 2 in which no substantial operation starts.

The wireless power transmitting apparatus 1 according to an embodiment may minimize consumption of standby power by adjusting transmission of wireless power in the standby mode of the wireless device 1. Accordingly, power efficiency may be improved.

For this, the controller 330 of the wireless power transmitting apparatus 1 may control, in a case in which the wireless device 2 enters the standby mode, the driving circuit 310 to transmit, based on a transmission period of wireless power, wireless power periodically set by a discharge characteristic of the wireless device 2. The periodic transmission of wireless power may be repeatedly performing an operation of initiating transmission of wireless power and stopping transmission of wireless power.

As described above, the discharge characteristic of the wireless device 2 may include a discharge time of the wireless device 2, measured in a state in which transmission of wireless power stops. The controller 330 of the wireless power transmitting apparatus 1 may set a transmission period of wireless power for the standby mode of the wireless device 2 based on the discharge time of the wireless device 2.

Hereinafter, an operation of the wireless power transmitting apparatus according to an embodiment will be described in more detail.

Figure 4:
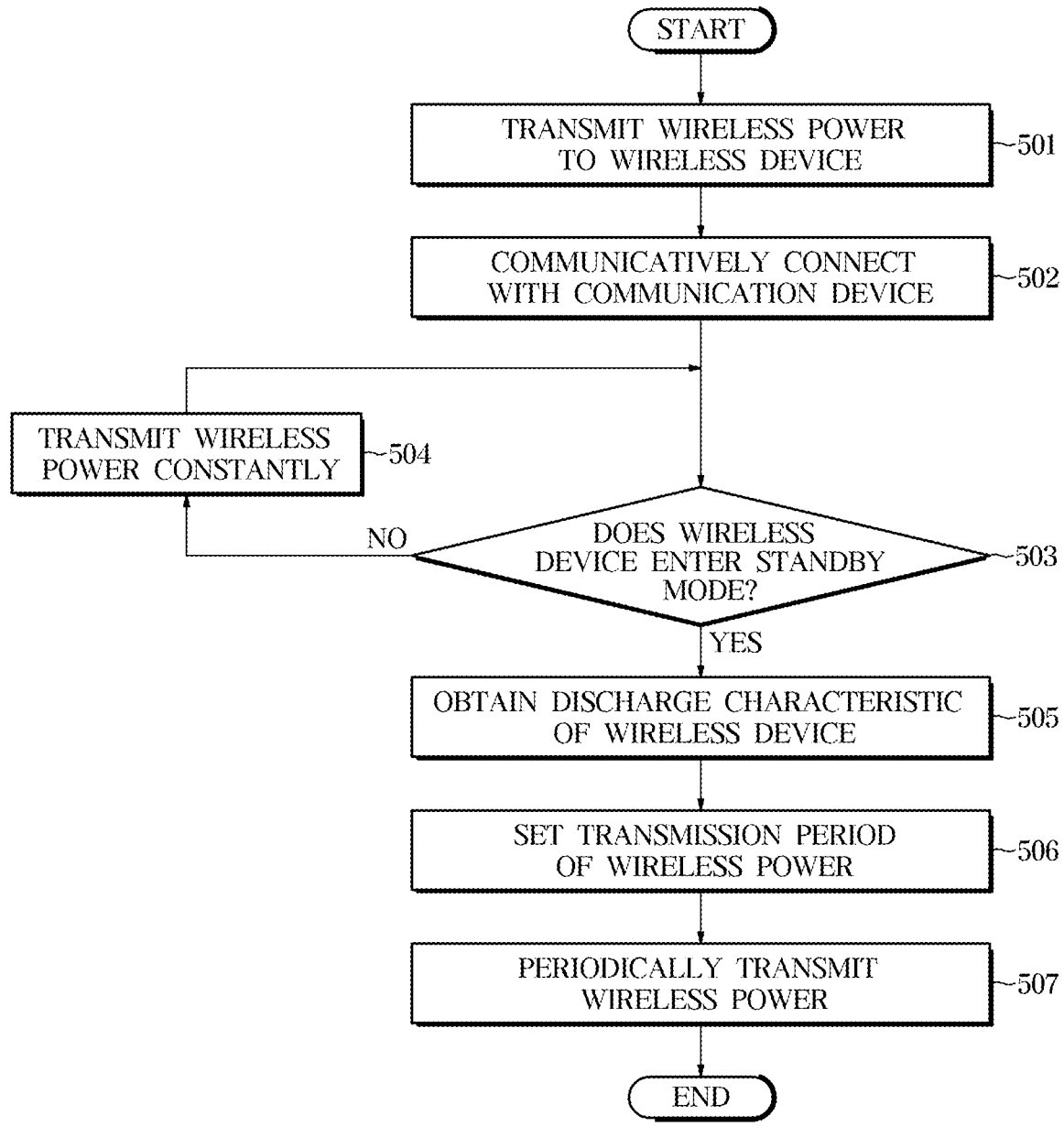
FIG. 4 is a flowchart illustrating a method for controlling a wireless power transmitting apparatus, according to an embodiment.

FIG. 4 is a flowchart illustrating a method for controlling the wireless power transmitting apparatus, according to an embodiment.

Referring to FIG. 4, the wireless power transmitting apparatus 1 may transmit wireless power to the wireless device 2 (501). That is, the controller 330 of the wireless power transmitting apparatus 1 may control the driving circuit 310 such that the transmitting coil 210 transmits wireless power. The communication module 430 of the wireless device 2 may be activated by receiving required power through the receiving coil 410 and the power converting circuit 420. According to the activation of the communication module 430 of the wireless device 2, the communication module 430 may be communicatively connected with the communication module 320 of the wireless power transmitting apparatus 1 (502).

Modes related to driving of the wireless device 2 may include an operation mode and a standby mode. The controller 330 of the wireless power transmitting apparatus 1 may identify a mode of the wireless device 2 based on data transmitted from the wireless device 2. That is, the controller 330 of the wireless power transmitting apparatus 1 may identify whether the wireless device 2 enters the standby mode (503).

In a case in which no user operation is detected for a preset time period after power is supplied from the wireless power transmitting apparatus 1 to the wireless device 2 and the wireless device 2 is powered on, the wireless device 2 may enter the standby mode. Also, in a case in which no user operation is detected for the preset time period after an operation mode terminates, the wireless device 2 may enter the standby mode. Also, the controller 330 of the wireless power transmitting apparatus 1 may detect conversion from the operation mode to the standby mode of the wireless device 2 or from the standby mode to the operation mode.

The operation mode may be defined as a mode in which power is supplied to all the components of the wireless device 2. The standby mode may be defined as a low power consumption mode in which power is supplied to some components of the wireless device 2. In the standby mode, the wireless device 2 may be controlled to consume low power. For example, in the standby mode, the controller 450 of the wireless device 2 may control the power converting circuit 420 to supply power to the communication module 430 and the inputter 440 of the wireless device 2 without supplying power to the main load 460.

Before the wireless device 2 enters the standby mode, the controller 330 of the wireless power transmitting apparatus 1 may control the driving circuit 310 to transmit wireless power constantly (503 and 504). However, in a case in which the wireless device 2 enters the standby mode, the controller 330 of the wireless power transmitting apparatus 1 may obtain a discharge characteristic of the wireless device 2 (503 and 505).

As described above, the discharge characteristic of the wireless device 2 may be a concept including a discharge time of the wireless device 2, measured in a state in which transmission of wireless power stops. That is, the discharge characteristic of the wireless device 2 may be obtained by measuring a discharge time of the wireless device 2. A method for measuring a discharge time of the wireless device 2 will be described with reference to FIGS. 5 and 6.

The controller 330 of the wireless power transmitting apparatus 1 may set a transmission period of wireless power for the standby mode of the wireless device 2 based on the discharge characteristic of the wireless device 2 (506). Also, the controller 330 of the wireless power transmitting apparatus 1 may control the driving circuit 310 to periodically transmit wireless power based on the transmission period (507).

Meanwhile, the controller 330 of the wireless power transmitting apparatus 1 may register the wireless device 2 and store the set transmission period in the memory 332. In a case in which the registered wireless device 2 is again used, the controller 330 may adjust transmission of wireless power in the standby mode of the wireless device 2 by using the transmission period stored in the memory 332.

As such, by adjusting transmission of wireless power, it may be possible to maintain the standby mode of the wireless device 2 while minimizing consumption of standby power.

Figure 5:
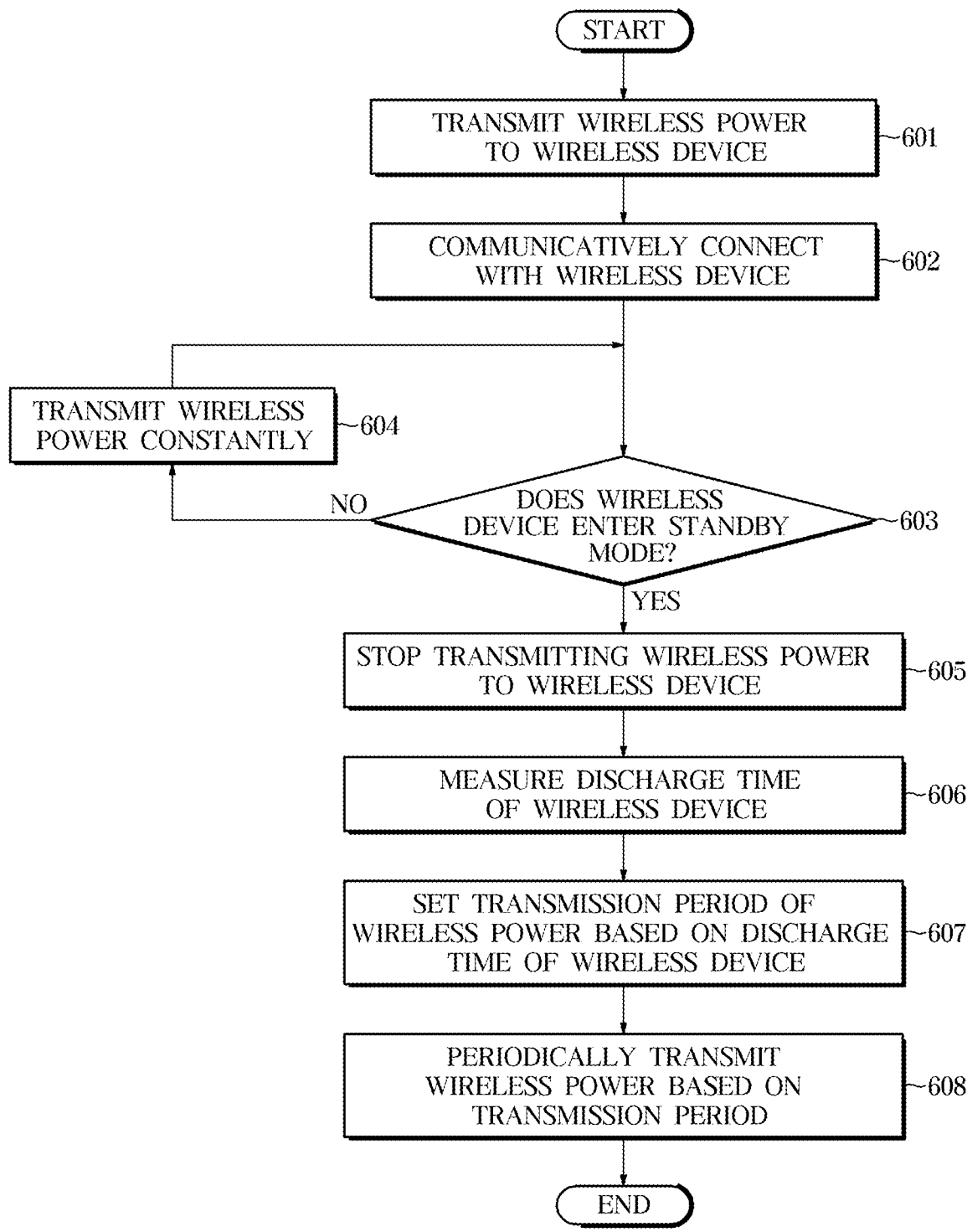
FIG. 5 is a flowchart for more detailedly describing the method for controlling the wireless power transmitting apparatus, according to an embodiment.

FIG. 5 is a flowchart for more detailedly describing the method for controlling the wireless power transmitting apparatus, according to an embodiment.

FIG. 5 describes a method for obtaining a discharge characteristic of the wireless device 2 that has not been registered. Referring to FIG. 5, the wireless power transmitting apparatus 1 may transmit wireless power to the wireless device 2 (601). That is, the controller 330 of the wireless power transmitting apparatus 1 may control the driving circuit 310 such that the transmitting coil 210 transmits wireless power.

The communication module 430 of the wireless device 2 may be activated by receiving required power through the receiving coil 410 and the power converting circuit 420. According to the activation of the communication module 430 of the wireless device 2, the communication module 430 may be communicatively connected with the communication module 320 of the wireless power transmitting apparatus 1 (602). Thereafter, the controller 330 of the wireless power transmitting apparatus 1 may identify whether the wireless device 2 enters the standby mode (603).

Before the wireless device 2 enters the standby mode, the controller 330 of the wireless power transmitting apparatus 1 may control the driving circuit 310 to transmit wireless power constantly (603 and 604). However, after the wireless device 2 enters the standby mode, the controller 330 of the wireless power transmitting apparatus 1 may control the driving circuit 310 to stop transmitting wireless power (603 and 605).

The controller 330 of the wireless power transmitting apparatus 1 may measure a discharge time of the wireless device 2 after transmission of wireless power stops (606). As described above, because the power converting circuit 420 of the wireless device 2 includes an energy storage device such as a capacitor, the wireless device 2 may further operate for a certain time even after power transmission from the wireless power transmitting apparatus 1 stops. That is, the discharge time may be a time elapsed from when power transmission to the wireless device 2 stops to when the wireless device 2 is turned off.

The controller 330 of the wireless power transmitting apparatus 1 may set a transmission period of wireless power in the standby mode based on the discharge time of the wireless device 2 (607). Also, the controller 330 of the wireless power transmitting apparatus 1 may control the driving circuit 310 to periodically transmit wireless power based on the transmission period (608). More specifically, the wireless power transmitting apparatus 1 may repeatedly perform an operation of transmitting wireless power to the wireless device 2 for a transmission time, then stopping transmitting wireless power, and again transmitting wireless power to the wireless device 2 immediately before the wireless device 2 is completely discharged.

Meanwhile, the controller 330 of the wireless power transmitting apparatus 1 may register the wireless device 2 and store the set transmission period in the memory 332. In a case in which the registered wireless device 2 is again used, the controller 330 may adjust transmission of wireless power in the standby mode of the wireless device 2 by using the transmission period stored in the memory 332.

Figure 6:
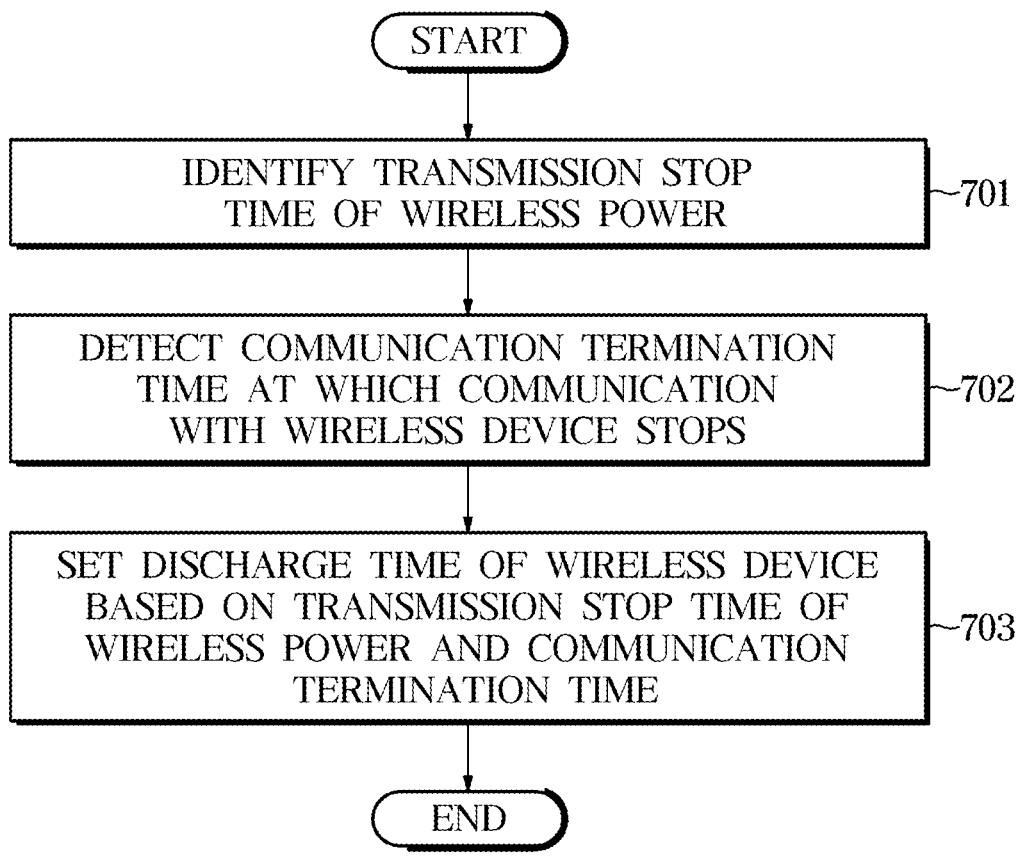
FIG. 6 is a flowchart illustrating a method for setting a discharge time of a wireless device.

FIG. 6 is a flowchart illustrating a method for setting a discharge time of a wireless device.

Referring to FIG. 6, the controller 330 of the wireless power transmitting apparatus 1 may identify a transmission stop time of wireless power (701), and detect a communication termination time at which a communication between the communication module 320 and the wireless device 2 stops (702). The controller 330 of the wireless power transmitting apparatus 1 may set a time elapsed from the transmission stop time of wireless power to the communication termination time to a discharge time of the wireless device 2.

After power transmission from the wireless power transmitting apparatus 1 stops, the communication module 430 of the wireless device 2 may operate until residual power stored in the power converting circuit 420 is consumed. Upon a stop of power transmission from the power converting circuit 420, the communication module 430 of the wireless device 2 may stop. Accordingly, by detecting a communication termination time at which a communication between the communication module 320 and the wireless device 2 terminates, a discharge time of the wireless device 2 may be calculated.

For example, the communication module 320 of the wireless power transmitting apparatus 1 may be an NFC module, and the communication module 430 of the wireless device 2 may be an NFC tag. In this case, the controller 330 of the wireless power transmitting apparatus 1 may set a time elapsed from a time at which transmission of wireless power stops to a time at which activation data stored in the NFC tag of the wireless device 2 is deleted, to a discharge time of the wireless device 2.

Also, the controller 330 of the wireless power transmitting apparatus 1 may identify whether the activation data exists in the communication module 430 of the wireless device 2 by transmitting a test signal to the wireless device 2.

Figure 7:
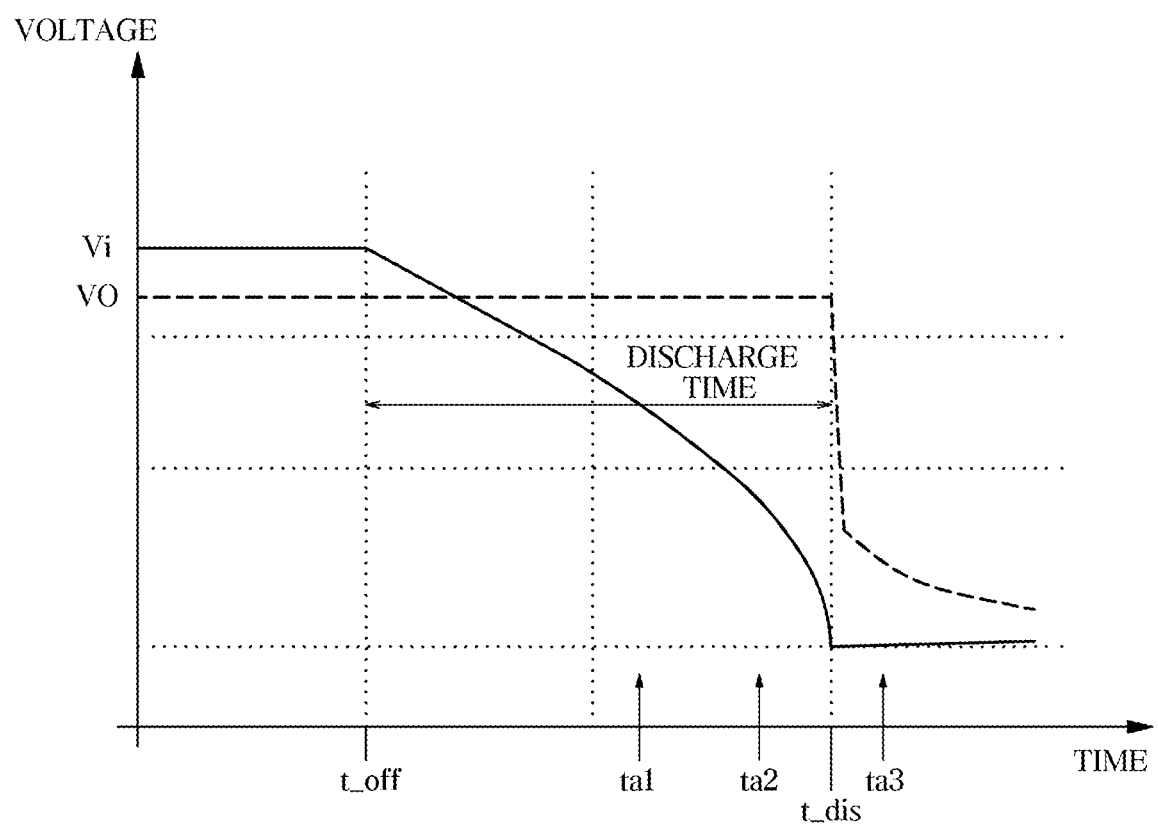
FIG. 7 is a graph for describing a discharge time of a wireless device.
Figure 8:
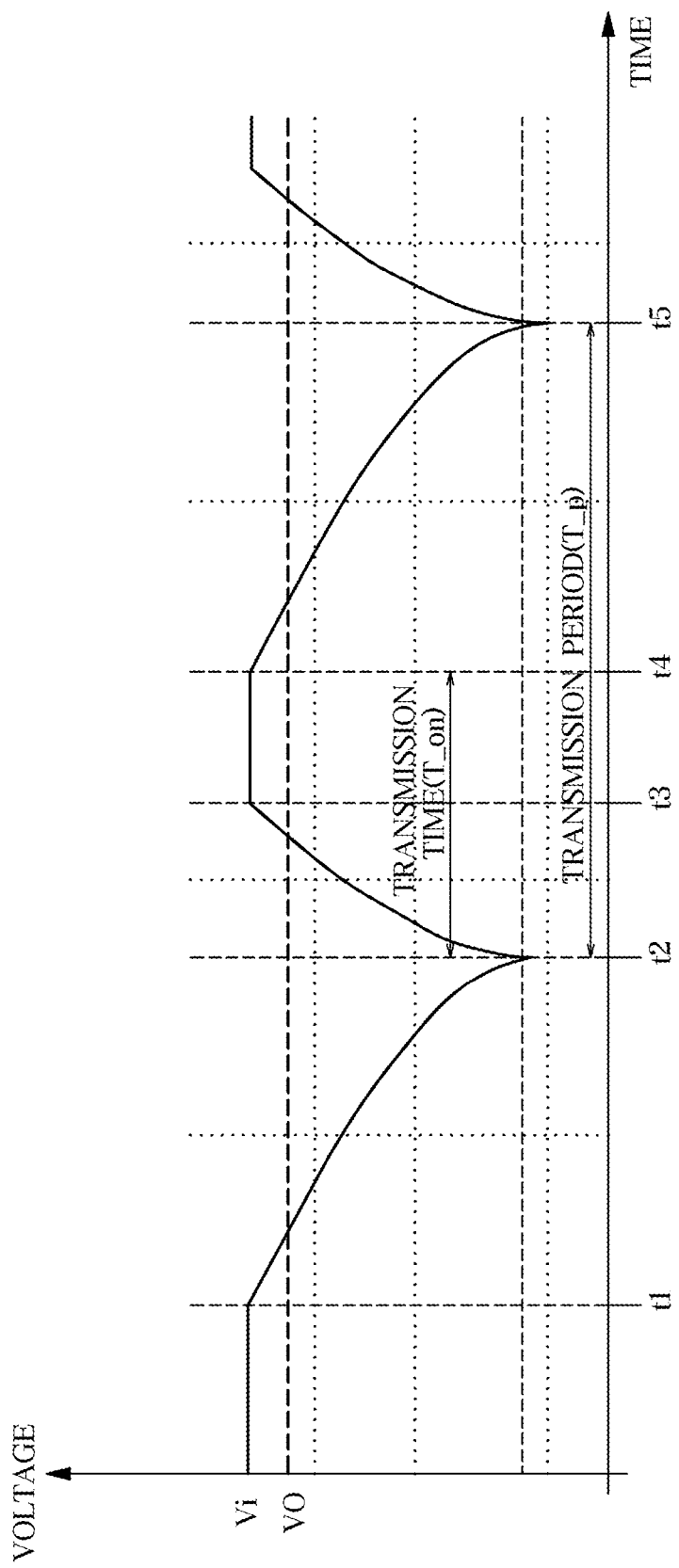
FIG. 8 is a graph showing periodic transmission of wireless power in a standby mode of a wireless device.

Also, as described above, a transmission period of wireless power in the standby mode may be set based on the discharge time of the wireless device 2. FIGS. 7 and 8 describe the discharge time and the transmission period of wireless power in more detail.

FIG. 7 is a graph for describing a discharge time of a wireless device.

Referring to FIG. 7, according to transmission of wireless power from the wireless power transmitting apparatus 1 to the wireless device 2, a first voltage Vi may be applied to the power converting circuit 420 in the wireless device 2. The power converting circuit 420 may convert the first voltage Vi to apply appropriate power to each component of the wireless device 2. Accordingly, a second voltage Vo having a magnitude that is different from a magnitude of the first voltage Vi may be applied to another component (for example, the inputter 440) of the wireless device 2, which receives power from the power converting circuit 420.

While the wireless power transmitting apparatus 1 transmits wireless power, the first voltage Vi applied to the power converting circuit 420 may be constant. However, at a transmission stop time t_off at which the wireless power transmitting apparatus 1 stops transmitting wireless power, the first voltage Vi that is applied to the power converting circuit 420 may be reduced. Although the first voltage Vi is reduced, the second voltage Vo may be constant. However, upon an elapse of a discharge time (t_dis−t_off), the second voltage Vo may be reduced sharply, and all operations of the wireless device 2 may stop. A time t_dis at which the second voltage Vo is reduced sharply may correspond to a communication termination time.

The controller 330 of the wireless power transmitting apparatus 1 may identify whether activation data exists in the communication module 430 of the wireless device 2 by transmitting a test signal to the wireless device 2. The controller 330 of the wireless power transmitting apparatus 1 may control the communication module 320 of the wireless power transmitting apparatus 1 to transmit a test signal after transmission of wireless power stops.

FIG. 7 shows an example in which a test signal is transmitted at times ta1, ta2, and ta3. At the times ta1 and ta2, the controller 330 of the wireless power transmitting apparatus 1 may identify activation data. However, because the activation data is deleted from the communication module 430 of the wireless device 2 at the time t_dis, the controller 330 of the wireless power transmitting apparatus 1 may fail to identify the activation data at the time ta3. As such, the controller 330 of the wireless power transmitting apparatus 1 may identify a discharge time (t_dis−t_off) of the wireless device 2 by transmitting a plurality of test signals.

FIG. 8 is a graph showing periodic transmission of wireless power in a standby mode of a wireless device.

Referring to FIG. 8, in a case in which the wireless device 2 enters the standby mode, the wireless power transmitting apparatus 1 may transmit wireless power periodically. In other words, the wireless power transmitting apparatus 1 may repeatedly perform an operation of transmitting wireless power and stopping transmitting wireless power. In FIG. 8, transmission of wireless power may stop at times t1 and t4 and resume at times t2 and t5.

During an entire maintenance period of the standby mode, a second voltage Vo applied to another component of the wireless device 2, which receives power from the power converting circuit 420, may be constant. As such, by adjusting transmission of wireless power, it may be possible to continue to maintain the standby mode of the wireless device 2 while minimizing consumption of standby power. A user may wake up the wireless device 2 immediately as necessary for conversion to an operation mode.

A transmission period Tp of wireless power may be set longer than a discharge time. The transmission period Tp of wireless power may be set to a sum of a transmission time T_on of wireless power and the discharge time of the wireless device 2. For example, in a case in which the discharge time of the wireless device 2 is five seconds, the transmission time T_on of wireless power may be set to two seconds, and accordingly, the transmission period Tp of wireless power may be set to seven seconds.

As another example, the transmission period Tp of wireless power may be set to a time that is shorter than the sum of the discharge time and the transmission time. By transmitting wireless power immediately before the discharge time elapses, the standby mode may be prevented from being unstably maintained. For example, in a case in which a discharge time (t_dis−t_off) of the wireless device 2 is set to five seconds in FIG. 7, a transmission time T_on of wireless power may be set to two seconds, and a transmission period T_p of wireless power may be set to 6.9 seconds in FIG. 8. That is, an interval (t2−t1) for which wireless power stops in FIG. 8 may be set to be shorter than the discharge time (t_dis−t_off) of the wireless device 2.

Meanwhile, the transmission time T_on of wireless power may be a preset value or set based on a discharge characteristic of the wireless device 2. As described above, the wireless device 2 may have a unique discharge characteristic, and a characteristic of the power converting circuit 420 may depend on a kind of the wireless device 2. A time taken for a voltage applied to the power converting circuit 420 to reach a preset value may also depend on the kind of the wireless device 2.

FIGS. 9 and 10 are flowcharts for describing a method for controlling a wireless power transmitting apparatus for a registered wireless device.

Referring to FIG. 9, the wireless power transmitting apparatus 1 may transmit wireless power to the wireless device 2 (801). That is, the controller 330 of the wireless power transmitting apparatus 1 may control the driving circuit 310 such that the transmitting coil 210 transmits wireless power. The communication module 430 of the wireless device 2 may be activated by receiving required power through the receiving coil 410 and the power converting circuit 420. According to the activation of the communication module 430 of the wireless device 2, the communication module 430 may be communicatively connected with the communication module 320 of the wireless power transmitting apparatus 1 (802).

The wireless power transmitting apparatus 1 may identify whether the wireless device 2 is a registered device (803). In a case in which the wireless device 2 is a registered device, the wireless power transmitting apparatus 1 may identify whether the registered wireless device 2 enters the standby mode (804). Before the wireless device 2 enters the standby mode, the controller 330 of the wireless power transmitting apparatus 1 may control the driving circuit 310 to transmit wireless power constantly (805).

In a case in which the registered wireless device 2 enters the standby mode, the controller 330 of the wireless power transmitting apparatus 1 may obtain a transmission period of wireless power for the registered wireless device 2 from the memory 332 (806). The wireless power transmitting apparatus 1 may periodically transmit wireless power based on a transmission period of wireless power for the registered wireless device 2 (807). As such, by bringing data about the registered wireless device 2, a transmission control of wireless power may be performed immediately when the wireless device 2 enters the standby mode.

However, in a case in which the wireless device 2 is an unregistered device, the wireless power transmitting apparatus 1 may perform a process for setting a transmission period of wireless power in the standby mode of the wireless device 2. That is, in the case in which the wireless device 2 is an unregistered device, operations 503 to 507 of FIG. 4 or operations 603 to 608 of FIG. 5 may be performed.

Referring to FIG. 10, the wireless power transmitting apparatus 1 may receive a reset command for the standby mode of a registered wireless device 2 through the control panel 12 (901). A discharge characteristic may change due to aging or a state change of the wireless device 2. Although a transmission period of wireless power for the standby mode of the registered wireless device 2 has been stored in advance, a situation in which the stored transmission period becomes inappropriate may be generated. In this situation, a transmission period of wireless power for the standby mode of the wireless device 2 may need to be reset.

Upon reception of a reset command for the standby mode of the registered wireless device 2, the wireless power transmitting apparatus 1 may transmit wireless power to the wireless device 2 and then stop transmission (902). That is, the controller 330 of the wireless power transmitting apparatus 1 may control the driving circuit 310 to transmit wireless power for a preset time and then stop transmission.

Then, the controller 330 of the wireless power transmitting apparatus 1 may measure a discharge time of the wireless device 2 (903), and change a transmission period of wireless power based on the discharge time of the wireless device 2 (904). Also, the controller 330 of the wireless power transmitting apparatus 1 may store the changed transmission period of wireless power in the memory 332 (905). A method for measuring a discharge time of the wireless device 2 and changing a transmission period of wireless power has been described with reference to FIGS. 4 to 6. As such, by resetting a transmission period of wireless power for the standby mode of the wireless device 2, inappropriate consumption of standby power may be minimized.

As described above, the wireless power transmitting apparatus, the method for controlling the wireless power transmitting apparatus, and the wireless power system may minimize consumption of standby power by adjusting transmission of wireless power in the standby mode of a wireless device. Accordingly, power efficiency of the wireless power transmitting apparatus may be improved.

Meanwhile, the disclosed embodiments may be implemented in the form of a recording medium storing instructions that can be executed by a computer. The instructions may be stored in the form of program codes, and when executed by a processor, the instructions may create a program module to perform operations of the disclosed embodiments.

The machine-readable storage medium may be provided in the form of a non-transitory storage medium, wherein the 'non-transitory storage medium' simply means that the storage medium is a tangible device, and does not include a signal (e.g., an electromagnetic wave), but this term does not differentiate between where data is semi-permanently stored in the storage medium and where the data is temporarily stored in the storage medium. For example, a 'non-transitory storage medium' may include a buffer in which data is temporarily stored.

The method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product (e.g., a downloadable app) may be temporarily generated or at least temporarily stored in the machine-readable storage medium, such as a memory of the manufacturer's server, a server of the application store, or a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. A wireless power transmitting apparatus comprising:
   a plate;
   a transmitting coil configured to transmit wireless power to a cooking device positioned on the plate, the cooking device including a heater;
   a driving circuit configured to apply current to the transmitting coil;
   a communication module configured to communicate with the cooking device; and
   a controller configured to:
      determine a transmission period of the wireless power based on a discharge characteristic of the cooking device in a case in which the cooking device enters a standby mode, and
      control the driving circuit to periodically transmit the wireless power based on the determined transmission period of the wireless power,
   wherein the discharge characteristic corresponds to a discharge time from a time when power transmission to a cooking device stops to a time when power transmission from an energy storage of the cooking device stops.

2. The wireless power transmitting apparatus of claim 1, wherein the controller is configured to:
control, in a case in which the cooking device enters the standby mode, the driving circuit to stop transmitting the wireless power, and
measure the discharge time of the cooking device after stopping transmission of the wireless power.

3. The wireless power transmitting apparatus of claim 2, wherein the controller is configured to:
detect a communication termination time at which a communication between the communication module and the cooking device terminates, and
set a time elapsed from a transmission stop time of the wireless power to the communication termination time as the discharge time of the cooking device.

4. The wireless power transmitting apparatus of claim 2, wherein the controller is configured to;
identify whether activation data indicating an activation state of the communication module of the cooking device is stored in a communication module of the cooking device,
set a time elapsed from a transmission stop time of the wireless power to a time at which the activation data stored in the communication module of the cooking device is deleted as the discharge time of the cooking device.

5. The wireless power transmitting apparatus of claim 4, wherein the controller is configured to identify whether the activation data exists is stored in the communication module of the cooking device by transmitting a test signal to the cooking device.

6. The wireless power transmitting apparatus of claim 1, wherein the controller is configured to obtain, in a case in which the cooking device is a registered device, a transmission period of wireless power for the registered cooking device from a memory.

7. The wireless power transmitting apparatus of claim 6, wherein the controller is configured to:
control, in a case in which a reset command for the standby mode of the registered cooking device is received, the driving circuit to transmit the wireless power to the cooking device and then stop transmitting the wireless power to the cooking device, and
change the transmission period of the wireless power by measuring the discharge time of the cooking device.

8. A method for controlling a wireless power transmitting apparatus including a transmitting coil, a driving circuit configured to apply current to the transmitting coil, and a communication module, comprising:
transmitting wireless power to a cooking device positioned on a plate by the transmitting coil, the cooking device including a heater;
communicating with the cooking device by the communication module;
obtaining a discharge characteristic of the cooking device in a case in which the cooking device enters a standby mode;
setting a transmission period of the wireless power based on the discharge characteristic of the cooking device; and
controlling the driving circuit configured to apply current to the transmitting coil such that the wireless power is periodically transmitted,
wherein the discharge characteristic corresponds to a discharge time from a time when power transmission to the cooking device stops to a time when power transmission from an energy storage of the cooking device stops.

9. The method of claim 8, wherein the obtaining of the discharge characteristic of the cooking device comprises:
controlling the driving circuit to stop transmitting the wireless power in a case in which the cooking device enters the standby mode; and
measuring the discharge time of the cooking device after stopping transmission of the wireless power.

10. The method of claim 9, wherein the measuring of the discharge time of the cooking device comprises:
detecting a communication termination time at which a communication between the communication module and the cooking device terminates; and
setting a time elapsed from a transmission stop time of the wireless power to the communication termination time as the discharge time of the cooking device.

11. The method of claim 9, wherein the measuring of the discharge time of the cooking device comprises:
Identifying whether activation data indicating an activation state of the communication module of the cooking device is stored in a communication module of the cooking device; and
setting a time elapsed from a transmission stop time of the wireless power to a time at which the activation data stored in the communication module of the cooking device is deleted as the discharge time of the cooking device.

12. The method of claim 11, wherein the measuring of the discharge time of the cooking device further comprises identifying whether the activation data is stored in the communication module of the cooking device by transmitting a test signal to the cooking device.

13. The method of claim 8, wherein the setting of the transmission period of the wireless power comprises obtaining, in a case in which the cooking device is a registered device, a transmission period of wireless power for the registered cooking device from a memory.

14. The method of claim 13, further comprising:
controlling, in a case in which a reset command for the standby mode of the registered cooking device is received, the driving circuit to transmit the wireless power to the cooking device and then stop transmission; and
changing the transmission period of the wireless power by measuring the discharge time of the cooking device.

* * * * *